US009605760B2

(12) United States Patent
Mishra et al.

(10) Patent No.: US 9,605,760 B2
(45) Date of Patent: Mar. 28, 2017

(54) PINION SEAL FOR TRACTION MOTOR GEAR CASE

(71) Applicant: Electro-Motive Diesel, Inc., Lagrange, IL (US)

(72) Inventors: Saket Ashokkumar Mishra, Burr Ridge, IL (US); Michael Christopher Conboy, III, Bolingbrook, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 635 days.

(21) Appl. No.: 13/968,673

(22) Filed: Aug. 16, 2013

(65) Prior Publication Data

US 2015/0047462 A1 Feb. 19, 2015

(51) Int. Cl.
| | | |
|---|---|---|
| *F16J 9/00* | (2006.01) |
| *F16J 15/10* | (2006.01) |
| *B29D 99/00* | (2010.01) |
| *B29C 70/68* | (2006.01) |
| B29K 27/18 | (2006.01) |
| B29K 683/00 | (2006.01) |

(52) U.S. Cl.
CPC .............. *F16J 15/104* (2013.01); *B29C 70/68* (2013.01); *B29D 99/0053* (2013.01); *F16J 15/108* (2013.01); *B29K 2027/18* (2013.01); *B29K 2683/00* (2013.01); *B29K 2715/003* (2013.01); *Y10T 74/2186* (2015.01)

(58) Field of Classification Search
CPC ........ F16J 15/104; F16J 15/108; B29C 70/68; B29D 99/0053; B29K 2027/18; B29K 2683/00; B29K 2715/003; F16D 3/84; F16H 2048/087; F16H 2048/426; F16H 2057/02073; F16H 57/029; Y10T 74/2186

USPC ....... 277/345; 74/606 R; 105/96.1, 136, 138, 105/140

See application file for complete search history.

(56) References Cited

U.S. PATENT DOCUMENTS

| | | | | |
|---|---|---|---|---|
| 2,684,262 A | * | 7/1954 | Neesen ..................... | F16J 15/20 277/529 |
| 3,565,279 A | * | 2/1971 | Joor, II ................... | B65D 88/46 220/224 |
| 4,353,478 A | * | 10/1982 | Clark ..................... | B65D 88/46 220/224 |
| 4,573,373 A | * | 3/1986 | Shimizu ................... | F16H 3/54 184/6.12 |
| 4,603,865 A | | 8/1986 | Bien | |
| 4,848,776 A | | 7/1989 | Winckler | |

(Continued)

FOREIGN PATENT DOCUMENTS

EP 0419054 3/1991

OTHER PUBLICATIONS

Oblique angle The Free dictionary.*

*Primary Examiner* — Nathan Cumar
(74) *Attorney, Agent, or Firm* — Finnegan, Henderson, Farabow, Garrett & Dunner, LLP

(57) ABSTRACT

A gear case seal is provided for use with a traction motor. The seal may have an arcuate body with an outer annular layer forming a centrally located channel extending along its length, and an inner annular layer bonded to the outer annular layer along opposing axial edges so as to close off the centrally located channel. The body may also have a middle layer disposed within the centrally located channel and made from a material different than a material of the inner and outer layers.

19 Claims, 3 Drawing Sheets

(56) References Cited

U.S. PATENT DOCUMENTS

| | | |
|---|---|---|
| 5,123,297 A | 6/1992 | Renk et al. |
| 5,676,221 A | 10/1997 | Renk et al. |
| 6,722,657 B2 | 4/2004 | Hood et al. |
| 8,029,635 B2* | 10/2011 | Aburatani ............... B32B 37/00 |
| | | 156/226 |
| 8,100,412 B2 | 1/2012 | Helfert et al. |
| 8,235,391 B2 | 8/2012 | Hatch et al. |
| 8,333,665 B2 | 12/2012 | Kohara |
| 2004/0096723 A1* | 5/2004 | Debe .................. H01M 8/0271 |
| | | 429/483 |
| 2004/0135322 A1* | 7/2004 | Weisbrodt ............. F16J 15/104 |
| | | 277/608 |

* cited by examiner

PINION SEAL FOR TRACTION MOTOR GEAR CASE

TECHNICAL FIELD

The present disclosure is directed to a seal and, more particularly, to a pinion seal for a traction motor gear case.

BACKGROUND

A locomotive includes multiple different traction motors that drive separate wheel sets to propel the locomotive. Each traction motor receives electricity from a generator powered by one or more engines of the locomotive. The traction motor converts the electricity to mechanical rotation, and transfers the rotation to the corresponding wheel set via a shaft and a set of reduction gears.

The reduction gears are housed within a gear case, and the shaft passes through an opening in a first side wall of the gear case. A pinion gear is connected to an end of the shaft opposite the motor and engages a bull gear inside the gear case. The bull gear is connected to a corresponding wheel shaft, which extends through an opening in an opposing second side of the gear case. Seals are located around the motor shaft and the wheel shaft at the first and second side walls to help retain lubricating fluids within the gear case. The seal around the motor shaft is commonly known as a pinion seal.

Historically, the pinion seal has been fabricated from an adhesive. In particular, an adhesive was applied to the gear case and to surfaces of the traction motor and allowed to set, so as to create a fluid tight seal around the motor shaft. This type of seal, however, often does not bond properly with the gear case and/or the traction motor due to residual oil or debris left on the surfaces from machining processes. In order to try to improve bonding of the adhesive, strict cleaning regimes have been implemented. The adhesive seal has still proven to fail under certain conditions, allowing lubricant to leak from the gear case, and the strict cleaning regimes have increased a cost of seal fabrication.

An alternative pinion seal is described in U.S. Pat. No. 5,123,297 that issued to Renk et al. on Jun. 23, 1992 ("the '297 patent"). Specifically, the '297 patent discloses a lubricant retaining device molded from a deformable elastomeric material. The device has a base, a rim with compressible lips, a column connecting the rim to the base, and deformable legs extending from the base. The rim is configured to receive a traction motor collar, with the lips extending radially inward into a groove of the collar. The legs of the base are configured to extend in an opposite direction (i.e., radially outward) into a holding channel of an associated gear case. When installed, the lips and the legs provide a slight interfering fit within the groove and the channel, thereby creating a seal that inhibits leakage of lubricant from the gear case.

While the lubricant retaining device disclosed in the '297 patent may have improved sealing over the traditional adhesive discussed above, it may still be problematic. In particular, the device, because of the need for precise placement of the lips and legs within corresponding grooves and channels, may be prone to improper assembly and/or damage during assembly. In addition, because the device relies on a single means of sealing (i.e., an interference fit), the device may have reduced applicability (e.g., applicability to only low-pressure applications and/or highly viscous applications).

The pinion seal of the present disclosure is directed at solving one or more of the problems sot forth above and/or other problems in the art.

SUMMARY

In one aspect, the disclosure is related to a seal for a gear case of a traction motor. The seal may include an arcuate body having an outer annular layer forming a centrally located channel extending along its length, and an inner annular layer bonded to the outer annular layer along opposing axial edges so as to close off the centrally located channel. The body may also have a middle layer disposed within the centrally located channel and made from a material different than a material of the inner and outer layers.

In another aspect, the disclosure is related to a traction motor gear case assembly. The traction motor gear case assembly may include a traction motor shaft, a pinion gear mounted to a distal end of the traction motor shaft, and a bearing configured to support rotation of the traction motor shaft. The traction motor gear case assembly may also have a bearing support structure configured to contain the bearing and having an annular flange extending radially outward at the pinion gear. The traction motor gear case assembly may also include a gear case configured to contain the pinion gear. The gear case may have a wall with an annular groove that is generally concentric with the annular flange of the bearing support structure, and a seal may be disposed between the bearing support structure and the gear case. The seal may have an outer annular layer fabricated from a synthetic flouropolymer and forming a first centrally located channel extending along its length and an outer protrusion configured to be received within the annular groove of the wall of the gear case. The seal may also have an inner annular layer fabricated from a synthetic flouropolymer, bonded to the outer annular layer along opposing axial edges so as to close off the centrally located channel, and forming a second centrally located channel configured to receive the annular flange of the bearing support. The seal may additionally have a closed-cell foam middle layer disposed within the first centrally located channel and annularly bonded to the inner and outer annular layers. The inner and outer annular layers may together form legs at the opposing axial edges that extend away from the centrally located channel. The body at the centrally located channel may be configured to form a radial compressive seal and the legs may be configured to form gap seals.

In another aspect, the disclosure is related to a method of forming a pinion seal for a traction motor gear case. The method may include molding an outer arcuate layer from a synthetic flouropolymer to form a first centrally located channel extending along its length, and molding an inner arcuate layer from the synthetic flouropolymer to form a second centrally located channel extending along its length. The method may also include laying a closed-cell foam middle layer having an adhesive backing into the first centrally located channel of the outer arcuate layer, applying an adhesive backing to the inner arcuate layer, and placing the inner arcuate layer over the outer arcuate layer and the closed-cell foam middle layer. The method may further include rolling the inner arcuate layer, the outer arcuate layer, and the closed-cell foam middle layer to bond the closed cell foam middle layer to the inner and outer arcuate layers and to bond axial edges of the inner and outer arcuate layers to each other.

DETAILED DESCRIPTION

Figure 1:
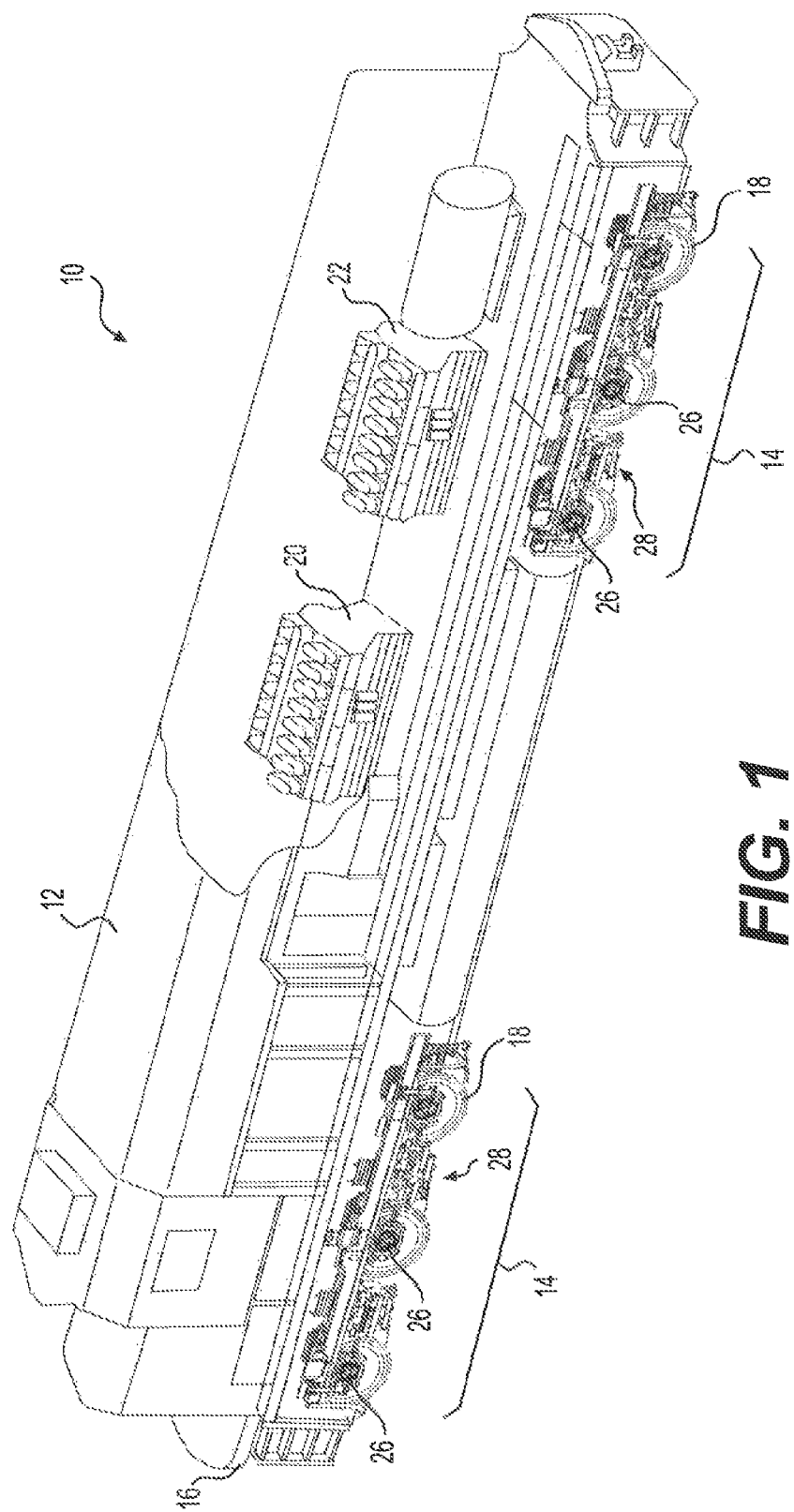
FIG. 1 is an isometric illustration of an exemplary disclosed locomotive.

FIG. 1 illustrates an exemplary locomotive 10 that includes a car body 12 supported at opposing ends by a plurality of trucks 14 (e.g., two trucks 14). Each truck 14 nay be configured to engage a track (not shown) and support a base platform 16 of car body 12. Any number of engines may be mounted to base platform 16 and configured to drive a plurality of wheels 18 included within each truck 14. In the exemplary embodiment shown in FIG. 1, locomotive 10 includes a first engine 20 and a second engine 22 that are lengthwise aligned on base platform 16 in a travel direction of locomotive 10. One skilled in the art will recognize, however, that first and second engines 20, 22 may be arranged transversally or in any other orientation on base platform 16 and/or that a different number of engines may be included.

Each truck 14 may have two or more axles 26 that are each configured to rigidly support wheels 18 at opposing ends thereof, such that wheels 18 and axles 26 rotate together. A traction motor 28, for example an electric motor driven with power generated by first and/or second engines 20, 22 (referring to FIG. 1), may be disposed at a lengthwise center of each axle 26, connected to a frame of truck 14, and configured to drive paired wheels 18 via axles 26.

Figure 3:
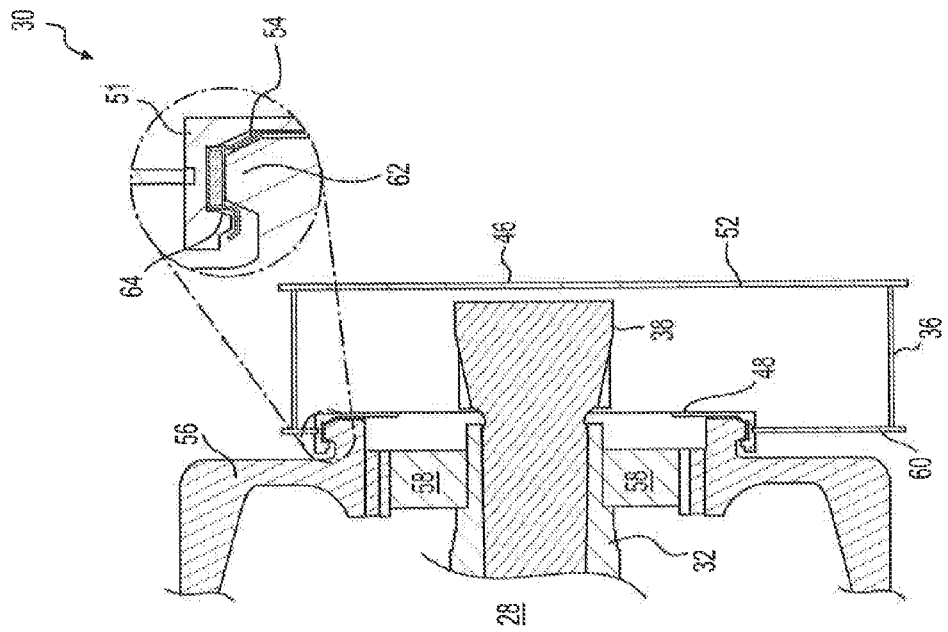
FIGS. 2 and 3 are isometric and cross-sectional illustrations, respectively, of an exemplary traction motor gear case assembly that may be used in conjunction with the locomotive shown in FIG. 1.
Figure 2:
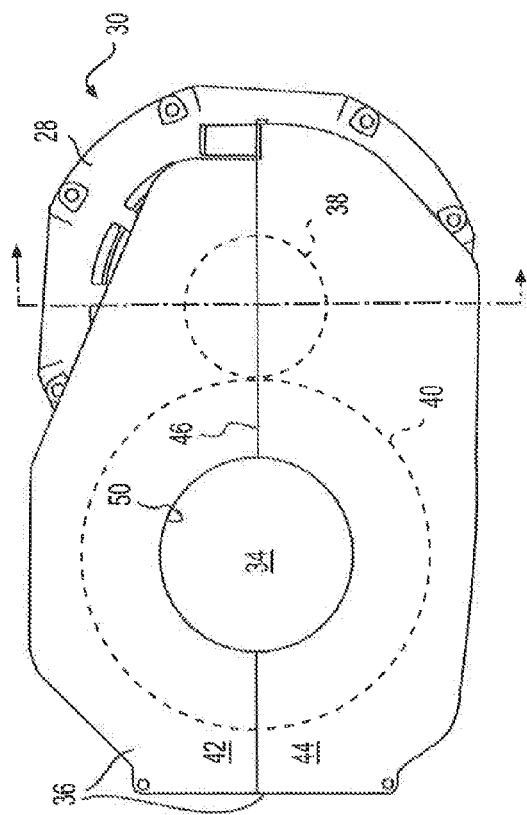
Figure 4:
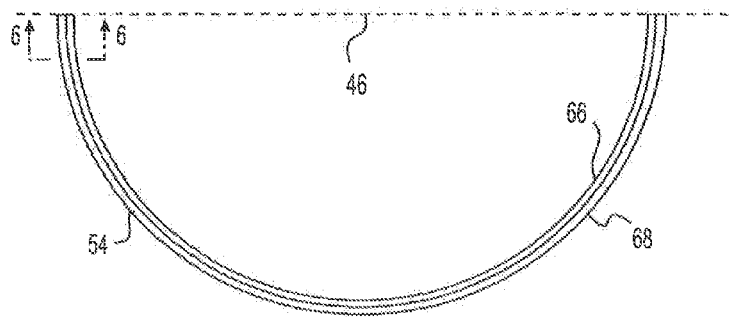
FIGS. 4-7 are side, end, cross-sectional, and enlarged view illustrations, respectively, of an exemplary seal that may be used in conjunction with the traction motor gear case assembly of FIGS. 2 and 3.
Figure 5:
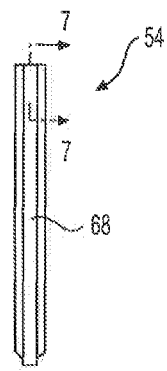
Figure 6:
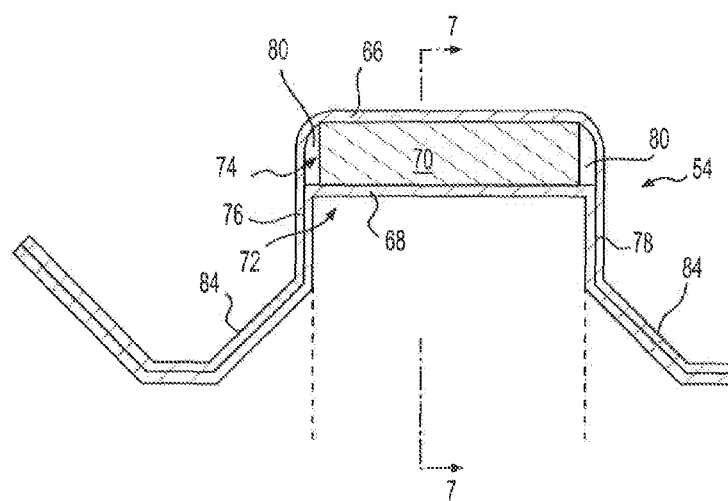
Figure 7:
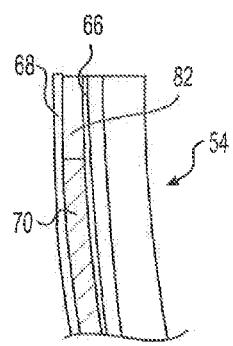

As shown in FIGS. 2 and 3, a gear case assembly 30 may be associated with each traction motor 28, and configured to affect a speed-to-torque ratio of the power output of traction motor 28. For example, gear case assembly 30 may be disposed between a motor shaft 32 (shown only in FIG. 3) of traction motor 28 and a wheel shaft 34 (shown only in FIG. 2) of wheel 18. Gear case assembly 32 may include, among other things, a housing 36, a first gear (e.g., a pinion gear—shown only in FIG. 3) 38 connected to a distal end of motor shaft 32, and a second gear (e.g., a bull gear—shown only in FIG. 2) 40 connected to an end of wheel shaft 34. First gear 38 may be configured to mesh with and drive second gear 40. Housing 36 may be configured to protect first and second gears 38, 40 from dust and debris in the environment, as well as to retain a lubricating fluid at an interface of first and second gears 38, 40.

Housing 36 may be split into a first half 42 and a second half 44 that are connected to each other along a parting line 46. Parting line 46 may pass through an axial center of a pinion bore 48 (referring to FIG. 3) associated with motor shaft 32 and through an axial center of a bull bore 50 associated with wheel shaft 34. Together, first and second halves 42, 44 may form a generally hollow structure defining an at least partially enclosed space that houses first and second gears 38, 40. An annular lip 51 may be formed in a side wall 60 of housing 36 at first gear 38 to aid in sealing housing 36 to traction motor 28. Housing 36 may be equipped with a conventional bull seal (not shown) that engages wheel shaft 34 at a side wall 52, and a pinion seal 54 that engages lip 51 and a bearing support 56 (i.e., a support structure configured to mount and contain a bearing 58) of traction motor 28 at side wall 60.

As seen in the enlarged portion of FIG. 3, pinion seal 54 may be configured to seal against lip 51 of housing 36 at an outer periphery thereof, and seal against a flange 62 of bearing support 56 at an inner periphery. Specifically, flange 62 may extend radially outward at first gear 38 and be generally concentric with an annular groove 64 located within, an inner surface of lip 51; and pinion seal 54 may be insertable into groove 64 and configured to internally receive flange 62. As will be described in more detail below, pinion seal 54 may create a sealing interface in two different ways. In particular, pinion seal 54 may create a radial compression seal between flange 62 and groove 64, and create a gap seal within a clearance that exists between radial surfaces of bearing support 56 and lip 51 located at axial ends of flange 62 and groove 64.

As seen in FIGS. 4-7, pinion seal 54 may be generally arcuate and include a single circular body or two substantially identical semi-circular bodies (shown in FIG. 4) that are configured to be installed end-to-end to create the complete circular shape that surrounds motor shaft 32. A two-piece design may be simpler to assemble than a single piece design, in some applications. A single piece design, however, may be more robust and/or have enhanced sealing properties, in other applications.

Pinion seal 54 may be fabricated from three different layers, including an outer annular layer 66, an inner annular layer 68, and a middle layer 70 disposed between inner and outer annular layers 66, 68. Each of inner and outer annular layers 66, 68 may include a centrally-located channel 72, 74 that extends along its length, and channels 72, 74 may be generally concentric with each other and form an enclosed annular space that is substantially filled with middle layer 70. Opposing axial edges 76, 78 of inner and outer annular layers 66, 68 may be bonded to each other during manufacture, such that the enclosed annular space is substantially sealed from the environment.

The formation of channel 74 within outer annular layer 68 may create a corresponding annular protrusion at an outer surface thereof having a profile generally matching the inner surface profile of channel 72. Channel 72 of inner annular layer 66 may be configured to receive flange 62 of traction motor 28, while the annular protrusion of channel 74 may be configured to be received within groove 64 of housing 36 of gear case assembly 30. As pinion seal 54 is installed between flange 62 and groove 64, annular portions of channels 72, 74 and middle layer 70 may be pressed together by opposing surfaces of flange 62 and groove 64, thereby sealing an interface between traction motor 28 and gear case assembly 30.

Middle layer 70 may include a filler material that is different from a material of inner and outer annular layers 66, 68. In the disclosed embodiment, inner and outer annular layers 66, 68 are fabricated from a synthetic flouropolymer, while middle layer 70 is fabricated from a closed-cell foam. For example, inner and outer layers 66, 68 may be fabricated from a skived polytetraflouroethylene, while middle layer 70 may be fabricated from silicone foam. The material of inner and outer layers 70, 72 may allow pinion seal 54 to deform elastically and fill voids within flange 62 and/or groove 64, while the material of middle layer 70 may allow for compression and expansion that fills spaces therebetween during assembly. Middle layer 70 may be bonded to surfaces of channels 72, 74 of inner and outer layers 66, 68, respectively.

In the disclosed embodiment, annular spaces 80 exist at the axial ends of middle layer 70 (shown only in FIG. 6) when pinion seal 54 is uncompressed. These spaces 80 may allow the foam material to expand in an axial direction when compressed during assembly. Spaces 80 may be substantially filled with the foam material of middle layer 70 when pinion seal 54 is compressed.

In a similar manner, an arc length of middle layer 70 may be less than an arc length of inner and outer annular layers 66, 68 when pinion seal 54 is uncompressed. With this configuration, as pinion seal 54 is compressed, the foam material may be pushed out into spaces 82 at ends thereof between inner and outer layers 66, 68. When pinion seal 54 is installed (and middle layer 70 is compressed), the installed arc length of middle layer 70 may be about the same as arc lengths of inner and outer layers 66, 68.

Axial edges 76, 78 of inner and outer layers 66, 68 may form legs 84 that extend away from channels 72, 74 in opposing axial directions. In the disclosed embodiment, a cross-section of pinion seal 54 through channels 72, 74 and legs 84 has a general W-shape. That is, each leg 84 may extend radially inward and axially away from channels 72, 74 at an oblique angle (e.g., at about 45°) relative to side walls thereof, distal ends of legs 84 may be located away from the side walls by a distance about equal to an internal width of channels 72, 74, and the distal ends of the legs 84 may be located radially closer to channel 74 than a mid-point thereof. In a particular example, a thickness of legs 84 is about 0.030 inches, and pinion seal 54 has a leg-to-body thickness ratio of about 1:3 when uncompressed. In this same configuration, an internal width of channel 72 may be about equal to an internal height. This configuration may help ensure proper assembly of pinion seal 54 by inhibiting binding or folding of legs 84 within channel 72 and/or within undesired spaces between flange 62 and groove 64, while still ensuring proper compressive and gap sealing. It should be noted that legs 84 may have the same general configuration (i.e., shape and size) or a different configuration (shown in FIG. 6) to match the corresponding gap geometry between traction motor 28 and housing 36, as needed. It is contemplated that many different shapes and configurations may be possible.

INDUSTRIAL APPLICABILITY

The disclosed seal may be used in any application requiring lubricant retention. In exemplary embodiments, the disclosed seal is used to seal an interface between a traction motor and a gear case assembly, specifically around a motor axle at a pinion gear of the gear case assembly. In this application, the disclosed seal creates a radial compression seal and a gap seal, both of which help to retain high-pressure and/or low-viscosity fluids.

Pinion seal 54 may be fabricated by molding inner and outer layers 66, 68 to form channels 72, 74. A first adhesive backing may then be applied to one side of middle layer 70, and then middle layer 70 may be laid within channel 74 of outer annular layer 68 such that the first adhesive backing is located therebetween. A second adhesive backing may then be applied to the outer surface of inner annular layer 66, and inner annular layer 66 may be laid on top of middle layer 70, such that the second adhesive backing is located therebetween. The resulting composite may then be rolled to bond middle layer 70 to inner and outer layers 66, 68 at channels 72, 74, and to bond axial edges 76, 78 of inner and outer layers 66, 68 to each other.

The design of pinion seal 54 may improve manufacture of gear case assembly 30. In particular, the shape and configuration of legs 84 may help to inhibit improper assembly and reduce a likelihood of pinion seal 54 (i.e., of legs 84) folding or binding within channels 72, 74 during the assembly process. In addition, because pinion seal 54 may provide two forms of sealing, applications of pinion seal 54 may be increased.

It will be apparent to those skilled in the art that various modifications and variations can be made to the disclosed seal without departing from the scope of the disclosure. Other embodiments of the seal will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A seal for a gear case of a traction motor, the seal comprising an arcuate body extending circumferentially about a longitudinal axis, the arcuate body including:
   a first cylindrical wall, a second cylindrical wall, a first annular wall, a second annular wall, and a third annular wall;
   a radially outer layer including the first cylindrical wall, the first annular wall, and the second annular wall, wherein
      the first cylindrical wall has a length extending along an axial direction and a thickness extending along a radial direction,
      the axial direction is parallel to the longitudinal axis, and the radial direction is perpendicular to the axial direction,
      the first annular wall has a height extending along the radial direction and a thickness extending along the axial direction,
      the second annular wall has a height extending along the radial direction and a thickness extending along the axial direction, and
      the first cylindrical wall is disposed between the first annular wall and the second annular wall along the axial direction;
   a radially inner layer including the second cylindrical wall and the third annular wall, wherein
      the second cylindrical wall has a length extending along the axial direction and a thickness extending along the radial direction,
      the third annular wall has a height extending along the radial direction and a thickness extending along the axial direction, and
      the third annular wall is disposed between the first annular wall and the second annular wall along the axial direction;
   a centrally located channel defined at least partly by the first cylindrical wall, the second cylindrical wall, the first annular wall, and the second annular wall; and
   a middle layer disposed within the centrally located channel and made from a material that is different from a material of the radially outer layer and the radially inner layer,
   wherein the first annular wall is bonded to the third annular wall.

2. The seal of claim 1, wherein the radially inner layer and the radially outer layer are fabricated from a synthetic fluoropolymer, and the middle layer has a closed-cell foam structure.

3. The seal of claim 2, wherein the synthetic flouropolymer is skived polytetrafluoroethylene, and the middle layer is a silicone foam.

4. The seal of claim 1, wherein the middle layer is bonded to the first cylindrical wall and the second cylindrical wall.

5. The seal of claim 4, wherein a distance between the middle layer and the first annular wall defines a space within the centrally located channel.

6. The seal of claim 4, wherein the middle layer is in contact with the first annular wall and the second annular wall.

7. The seal of claim 1, wherein the arcuate body is a first arcuate body,
the seal further comprises a second arcuate body that is substantially identical to the first arcuate body, and
the first and second arcuate bodies are configured to be installed end-to-end to completely surround an associated motor shaft.

8. The seal of claim 7, wherein the middle layer defines a circumferential gap such that
an arc length of the middle layer about a circumferential direction is less than an arc length of the radially inner layer about the circumferential direction, and
the arc length of the middle layer is less than an arc length of the radially outer layer about the circumferential direction, and
wherein the circumferential direction extends around the longitudinal axis.

9. The seal of claim 7, wherein the middle layer forms a continuous ring about the longitudinal axis.

10. The seal of claim 1, wherein the radially inner layer and the radially outer layer each further include legs that extend away from the centrally located channel along the axial direction.

11. The seal of claim 10, wherein a cross-section of the seal through the centrally located channel and the legs has a general W-shape.

12. The seal of claim 10, wherein the seal has a leg-to-body thickness ratio of about 1:3 when the seal is uncompressed.

13. The seal of claim 12, wherein a thickness of the legs is about 0.030 inches.

14. The seal of claim 10, wherein the arcuate body at the centrally located channel is configured to form a radial compressive seal, and the legs are configured to form gap seals.

15. The seal of claim 10, wherein:
proximal portions of the legs extend toward the longitudinal axis along the radial direction and away from the centrally located channel along the axial direction at an oblique angle relative to side walls of the centrally located channel, and
distal portions of the legs extend away from the longitudinal axis along the radial direction and away from the centrally located channel along the axial direction.

16. The seal of claim 15, wherein the legs have a mid-point, and
the distal portions of the legs are located closer to the centrally located channel along the radial direction than the mid-point.

17. A traction motor gear case assembly, comprising:
a traction motor shaft;
a pinion gear mounted to a distal end of the traction motor shaft;
a bearing configured to support rotation of the traction motor shaft;
a bearing support structure containing the bearing and having an annular flange extending radially outward, away from the traction motor shaft;
a gear case containing the pinion gear and having a wall with an annular groove that is generally concentric with the annular flange of the bearing support structure; and
a seal disposed between the bearing support structure and the gear case, the seal including
a first cylindrical wall, a second cylindrical wall, a first annular wall, a second annular wall, and a third annular wall;
a radially outer layer extending circumferentially about a longitudinal axis and including the first cylindrical wall, the first annular wall, and the second annular wall, wherein
the first cylindrical wall has a length extending along an axial direction and a thickness extending along a radial direction,
the axial direction is parallel to the longitudinal axis, and the radial direction is perpendicular to the axial direction,
the first annular wall has a height extending along the radial direction and a thickness extending along the axial direction,
the second annular wall has a height extending along the radial direction and a thickness extending along the axial direction, and
the first cylindrical wall is disposed between the first annular wall and the second annular wall along the axial direction;
a radially inner layer extending circumferentially about the longitudinal axis and including the second cylindrical wall and the third annular wall, wherein
the second cylindrical wall has a length extending along the axial direction and a thickness extending along the radial direction,
the third annular wall has a height extending along the radial direction and a thickness extending along the axial direction, and
the third annular wall is disposed between the first annular wall and the second annular wall along the axial direction;
a centrally located channel defined at least partly by the first cylindrical wall, the second cylindrical wall, the first annular wall, and the second annular wall; and
a middle layer disposed within the centrally located channel and made from a material that is different from a material of the radially outer layer and the radially inner layer,
wherein the first annular wall is bonded to the third annular wall.

18. The seal of claim 1, further comprising a fourth annular wall,
wherein the radially inner layer further includes the fourth annular wall having a height extending along the radial direction and a thickness extending along the axial direction,
the second cylindrical wall is disposed between the third annular wall and the fourth annular wall along the axial direction, and
the third annular wall, the second cylindrical wall, and the fourth annular wall define a concavity that faces the longitudinal axis.

19. The seal of claim 18, wherein the fourth annular wall is disposed between the first annular wall and the second annular wall along the axial direction.

* * * * *